US009727636B2

(12) United States Patent
Olenick et al.

(10) Patent No.: US 9,727,636 B2
(45) Date of Patent: Aug. 8, 2017

(54) GENERATING EXCUTABLE CODE FROM COMPLAINT AND NON-COMPLIANT CONTROLS

(71) Applicant: Microsoft Technology Licensing, LLC, Redmond, WA (US)

(72) Inventors: Brad Olenick, Redmond, WA (US); Leon Ezequiel Welicki, Issaquah, WA (US); Justin Beckwith, Bellevue, WA (US); Tom Cox, Kenmore, WA (US); Vishal R. Joshi, Redmond, WA (US); Nafisa Bhojawala, Seattle, WA (US); Alvaro Rahul Dias, Bellevue, WA (US); Eric Hwa-Wei Wong, Bellevue, WA (US); David Anson, Snoqualmie, WA (US); Thao Doan, Redmond, WA (US); Stephen Michael Danton, Seattle, WA (US); Kristofer John Owens, Seattle, WA (US); Wai Man Yuen, Bellevue, WA (US); Madhur Joshi, Kirkland, WA (US); Bradley D. Millington, Bellevue, WA (US); Brendyn Alexander, Seattle, WA (US); Jean-Sebastien Goupil, Redmond, WA (US); Ming Chen, Redmond, WA (US); Andrew Birck, Seattle, WA (US); Andrew Forget, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 14/231,905

(22) Filed: Apr. 1, 2014

(65) Prior Publication Data

US 2015/0095791 A1 Apr. 2, 2015

Related U.S. Application Data

(60) Provisional application No. 61/905,128, filed on Nov. 15, 2013, provisional application No. 61/884,743, (Continued)

(51) Int. Cl.
*G06F 9/44* (2006.01)
*G06F 17/30* (2006.01)
(Continued)

(52) U.S. Cl.
CPC ...... *G06F 17/30654* (2013.01); *G06F 3/0481* (2013.01); *G06F 3/0482* (2013.01);
(Continued)

(58) Field of Classification Search
CPC .................. G06F 3/0481; G06F 17/3089
(Continued)

(56) References Cited

U.S. PATENT DOCUMENTS 5,625,763 A 4/1997 Cirne
5,845,299 A 12/1998 Arora et al.
(Continued)

FOREIGN PATENT DOCUMENTS

EP 1615118 1/2006
WO WO 02097601 A2 12/2002

OTHER PUBLICATIONS

Using UML to Visualize Role-Based Access Control Constraints—Indrakshi Ray, Na Li, Robert France and Dae-Kyoo Kim—Computer Science Dept. Colorado State University Fort Collins, CO—SACMAT'04, Jun. 2-4, 2004, Yorktown Heights,New York, USA.*
(Continued)

*Primary Examiner* — Francisco Aponte
(74) *Attorney, Agent, or Firm* — Workman Nydegger

(57) ABSTRACT

A hierarchy of controls and parts, that are each in accordance with constraints of a computing executing context. A control
(Continued)

is executable code that performs a function and which may impart a visualization. A part is a unit of visualization container that has its own visualization and/or shows visualizations from one or more compliant controls associated with the part.

12 Claims, 5 Drawing Sheets

Related U.S. Application Data filed on Sep. 30, 2013, provisional application No. 61/905,111, filed on Nov. 15, 2013, provisional application No. 61/905,243, filed on Nov. 17, 2013, provisional application No. 61/905,114, filed on Nov. 15, 2013, provisional application No. 61/905,116, filed on Nov. 15, 2013, provisional application No. 61/905,129, filed on Nov. 15, 2013, provisional application No. 61/905,105, filed on Nov. 15, 2013, provisional application No. 61/905,247, filed on Nov. 17, 2013, provisional application No. 61/905,101, filed on Nov. 15, 2013, provisional application No. 61/905,119, filed on Nov. 15, 2013.

(51) Int. Cl.
  *G06F 3/0484* (2013.01)
  *G06F 17/21* (2006.01)
  *G06F 3/0481* (2013.01)
  *G06F 3/0482* (2013.01)
  *G06F 3/0485* (2013.01)
  *G06F 3/0488* (2013.01)
  *G06F 9/48* (2006.01)

(52) U.S. Cl.
  CPC .......... *G06F 3/0484* (2013.01); *G06F 3/0485* (2013.01); *G06F 3/0488* (2013.01); *G06F 3/04817* (2013.01); *G06F 3/04842* (2013.01); *G06F 8/34* (2013.01); *G06F 9/4443* (2013.01); *G06F 9/4445* (2013.01); *G06F 9/4856* (2013.01); *G06F 17/218* (2013.01); *G06F 17/30398* (2013.01)

(58) Field of Classification Search
  USPC .......... 717/109, 120; 715/733–738, 205–208, 715/760
  See application file for complete search history.

(56) References Cited

U.S. PATENT DOCUMENTS

| | | | |
|---|---|---|---|
| 5,886,694 A * | 3/1999 | Breinberg | G09G 5/14 345/788 |
| 6,049,812 A | 4/2000 | Bertram et al. | |
| 6,460,060 B1 | 10/2002 | Maddalozzo et al. | |
| 6,473,891 B1 | 10/2002 | Shively | |
| 6,750,887 B1 * | 6/2004 | Kellerman | G06F 9/4443 715/788 |
| 6,919,890 B2 * | 7/2005 | Halstead, Jr. | G06T 11/60 345/440 |
| 6,944,829 B2 * | 9/2005 | Dando | G06F 9/4443 715/788 |
| 6,950,198 B1 | 9/2005 | Beraducci et al. | |
| 6,950,993 B2 * | 9/2005 | Breinberg | G06F 8/38 715/788 |
| 7,062,475 B1 | 6/2006 | Szabo et al. | |
| 7,243,335 B1 * | 7/2007 | Andrew | G06F 8/38 715/207 |
| 7,340,721 B1 * | 3/2008 | Bailey | G06F 8/34 717/109 |
| 7,401,289 B2 | 7/2008 | Lachhwani et al. | |
| 7,417,644 B2 * | 8/2008 | Cooper | G06F 9/4443 345/619 |
| 7,536,672 B1 | 5/2009 | Ruehle | |
| 7,577,938 B2 * | 8/2009 | Bent | G06F 8/38 715/762 |
| 7,624,342 B2 | 11/2009 | Matveyenko et al. | |
| 7,669,140 B2 | 2/2010 | Matthews et al. | |
| 7,730,418 B2 * | 6/2010 | Wang | G06F 9/4443 715/700 |
| 7,769,794 B2 * | 8/2010 | Moore | G06F 17/30126 707/822 |
| 7,823,077 B2 * | 10/2010 | Kurtz | G06F 17/30126 715/771 |
| 7,933,632 B2 | 4/2011 | Flynt et al. | |
| 7,954,064 B2 * | 5/2011 | Forstall | G06F 3/04817 715/765 |
| 8,095,412 B1 | 1/2012 | Zias et al. | |
| 8,181,156 B1 * | 5/2012 | Bobykin | G06F 17/3089 717/120 |
| 8,195,646 B2 * | 6/2012 | Evans | G06F 17/301 707/716 |
| 8,316,323 B2 * | 11/2012 | Saraiya | G06F 17/30941 715/853 |
| 8,321,847 B1 | 11/2012 | Garvin et al. | |
| 8,365,138 B2 * | 1/2013 | Iborra | G06F 8/30 717/104 |
| 8,453,065 B2 * | 5/2013 | Chaudhrl | G06F 3/04817 715/709 |
| 8,533,667 B2 * | 9/2013 | Alexander | G06F 8/315 700/30 |
| 8,543,824 B2 * | 9/2013 | Louch | H04L 63/10 380/232 |
| 8,856,681 B2 * | 10/2014 | Rodden | G09G 5/14 715/760 |
| 8,869,027 B2 * | 10/2014 | Louch | G06F 3/0481 715/700 |
| 8,990,199 B1 | 3/2015 | Ramesh | |
| 9,152,616 B2 | 10/2015 | Ying et al. | |
| 9,195,477 B1 | 11/2015 | Spencer | |
| 9,244,661 B1 | 1/2016 | Garvin et al. | |
| 9,244,971 B1 | 1/2016 | Kalki | |
| 2002/0105658 A1 | 8/2002 | Jackson et al. | |
| 2002/0138637 A1 | 9/2002 | Suzuoki et al. | |
| 2002/0147963 A1 * | 10/2002 | Lee | G06F 8/34 717/108 |
| 2003/0011638 A1 | 1/2003 | Chung | |
| 2003/0058286 A1 | 3/2003 | Dando | |
| 2003/0090504 A1 | 5/2003 | Brook et al. | |
| 2003/0137540 A1 | 7/2003 | Klevenz et al. | |
| 2003/0210274 A1 | 11/2003 | Subramanian et al. | |
| 2004/0098390 A1 | 5/2004 | Bayliss et al. | |
| 2004/0225581 A1 | 11/2004 | Wyle et al. | |
| 2004/0243576 A1 | 12/2004 | Shrivastava et al. | |
| 2005/0088410 A1 | 4/2005 | Chaudhri | |
| 2005/0125727 A1 | 6/2005 | Ramachandran et al. | |
| 2005/0131889 A1 | 6/2005 | Bennett et al. | |
| 2005/0177586 A1 * | 8/2005 | Chen | G06F 17/30905 |
| 2005/0188349 A1 | 8/2005 | Bent et al. | |
| 2006/0048071 A1 | 3/2006 | Jarrett et al. | |
| 2006/0053096 A1 | 3/2006 | Subramanian et al. | |
| 2006/0190833 A1 | 8/2006 | SanGiovanni et al. | |
| 2006/0253799 A1 | 11/2006 | Montroy | |
| 2006/0282771 A1 * | 12/2006 | Vinci | G06F 17/2725 715/209 |
| 2007/0024646 A1 | 2/2007 | Saarinen et al. | |
| 2007/0027851 A1 | 2/2007 | Kruy | |
| 2007/0033522 A1 | 2/2007 | Lin et al. | |
| 2007/0094326 A1 * | 4/2007 | Gupta | G06F 17/30902 709/203 |
| 2007/0136579 A1 | 6/2007 | Levy et al. | |
| 2007/0156740 A1 | 7/2007 | Leland et al. | |
| 2007/0162439 A1 | 7/2007 | Petropoulos et al. | |
| 2007/0209023 A1 | 9/2007 | Nakagawa et al. | |
| 2007/0233854 A1 | 10/2007 | Bukovec et al. | |
| 2007/0234195 A1 * | 10/2007 | Wells | G06F 17/30905 715/205 |

(56) References Cited

U.S. PATENT DOCUMENTS

| | | | |
|---|---|---|---|
| 2007/0288667 | A1 | 12/2007 | Kamata et al. |
| 2008/0065974 | A1 | 3/2008 | Campbell |
| 2008/0066080 | A1 | 3/2008 | Campbell |
| 2008/0109714 | A1 | 5/2008 | Kumar et al. |
| 2008/0109785 | A1* | 5/2008 | Bailey .................. G06F 8/34 717/109 |
| 2008/0144119 | A1 | 6/2008 | Otake |
| 2008/0177994 | A1 | 7/2008 | Mayer |
| 2008/0201401 | A1 | 8/2008 | Pugh et al. |
| 2008/0235618 | A1 | 9/2008 | Sadouski |
| 2008/0313648 | A1 | 12/2008 | Wang et al. |
| 2008/0320413 | A1 | 12/2008 | Oshiro et al. |
| 2009/0037605 | A1 | 2/2009 | Li |
| 2009/0055432 | A1 | 2/2009 | Smith |
| 2009/0106227 | A1 | 4/2009 | Davis |
| 2009/0119257 | A1 | 5/2009 | Waters |
| 2009/0254337 | A1 | 10/2009 | Sprecher et al. |
| 2009/0254822 | A1 | 10/2009 | Greenlee |
| 2009/0292989 | A1 | 11/2009 | Matthews |
| 2009/0319939 | A1 | 12/2009 | Danton et al. |
| 2010/0005053 | A1 | 1/2010 | Estes |
| 2010/0058227 | A1 | 3/2010 | Danton et al. |
| 2010/0115053 | A1 | 5/2010 | Ryu et al. |
| 2010/0174774 | A1 | 7/2010 | Kern et al. |
| 2010/0229115 | A1 | 9/2010 | Augustine et al. |
| 2010/0251143 | A1 | 9/2010 | Thomas et al. |
| 2010/0262905 | A1 | 10/2010 | Li |
| 2010/0269096 | A1* | 10/2010 | Araya .................. G06F 8/71 717/113 |
| 2010/0287530 | A1* | 11/2010 | MacLean ............... G06F 8/10 717/105 |
| 2010/0306696 | A1 | 12/2010 | Groth et al. |
| 2011/0173537 | A1 | 7/2011 | Hemphill |
| 2011/0289546 | A1 | 11/2011 | Pieczul et al. |
| 2012/0005581 | A1 | 1/2012 | Turner |
| 2012/0023442 | A1 | 1/2012 | Oshiro et al. |
| 2012/0030591 | A1 | 2/2012 | Demant et al. |
| 2012/0079379 | A1 | 3/2012 | Hathaway et al. |
| 2012/0124555 | A1* | 5/2012 | Bannoura ............. G06F 8/443 717/123 |
| 2012/0151361 | A1* | 6/2012 | Burton ............... G06F 17/3089 715/736 |
| 2012/0167008 | A1 | 6/2012 | Zaman et al. |
| 2012/0191502 | A1 | 7/2012 | Gross et al. |
| 2012/0206498 | A1 | 8/2012 | Kai et al. |
| 2012/0246487 | A1 | 9/2012 | Gu et al. |
| 2012/0254723 | A1* | 10/2012 | Kasa .................. G06F 17/272 715/234 |
| 2012/0324422 | A1* | 12/2012 | Chartier ............... G06F 8/75 717/109 |
| 2012/0330668 | A1 | 12/2012 | Verna et al. |
| 2012/0331441 | A1 | 12/2012 | Adamson |
| 2013/0086508 | A1 | 4/2013 | Oguz |
| 2013/0139056 | A1 | 5/2013 | Borkowski et al. |
| 2013/0145314 | A1 | 6/2013 | Dhar et al. |
| 2013/0191880 | A1 | 7/2013 | Conlan et al. |
| 2013/0219263 | A1 | 8/2013 | Abrahami |
| 2013/0247006 | A1 | 9/2013 | Trowbridge |
| 2013/0300758 | A1 | 11/2013 | Yerli |
| 2014/0258970 | A1 | 9/2014 | Brown et al. |
| 2014/0298253 | A1 | 10/2014 | Jin et al. |
| 2014/0366157 | A1 | 12/2014 | Yancey et al. |
| 2015/0058709 | A1 | 2/2015 | Zaletel |
| 2015/0149937 | A1 | 5/2015 | Khalid et al. |

OTHER PUBLICATIONS

"International Preliminary Report on Patentability Issued in PCT Patent Application No. PCT/US2014/057322", Mailed Date: Jan. 12, 2016, 6 Pages.

W3c: "HTML5—A Vocabulary and Associated APIs for HTML and XHTML", Published Aug. 6, 2013, Available at <<http://www.w3.org/TR/2013/CR-html5-20130806/embedded-content-0.html#the-iframe-element>>.

"International Search Report and Written Opinion Received for PCT patent Application No. PCT/US2014/057939" Mailed Date Dec. 1, 2014, 8 pages.

"International Search Report and Written Opinion Received for PCT patent Application No. PCT/US2014/057324" Mailed Date Dec. 1, 2014, 8 pages.

"International Search Report and Written Opinion Received for PCT Patent Application No. PCT /US2014/057323", Mailed Date: Dec. 10, 2014, 8 Pages.

"International Search Report & Written Opinion Received for PCT Patent Application No. PCT/US2014/057940", Mailed Date: Jan. 12, 2015, 10 Pages.

Kumar, Dhananjay, "Live Tiles in XAML based Windows 8 Metro Application", Published on: Mar. 29, 2012, Available at: http://debugmode.net/2012/03/29/lives-tiles-in-xaml-based-windows-8-metro-application/.

Thurrott, Paul, "Windows 8 Feature Focus: Live Tiles", Published on: Jan. 28, 2013, Available at: http://winsupersite.com/article/windows8/windows-8-feature-focus-live-tiles-144652.

"ACC97: How to Modify Query Properties in Microsoft Access", Available at least as early as Jan. 13, 2015, Available at <<http:/support.microsoft.com/kb/304451>>.

Brydon, Michael, "Access Tutorial: Parameter Queries", Published Aug. 1997, Available at <<http:/ fisher.osu.edu/~muhanna.1/837/MSAccess/tutorials/param.pdf>>.

International Search Report and Written opinion Issued in PCT Patent Application No. PCT/US2014/057322, Mailed Date: Jan. 22, 2015, 9 Pages.

International Search Report and Written Opinion Issued in PCT Application No. PCT/US2014/057938, Mailed Date: Feb. 6, 2015, 11 Pages.

International Search Report & Written Opinion for PCT Patent Application No. PCT/US2014/057321, Mailed Date: Feb. 6, 2015, 8 Pages.

"International Preliminary Report on Patentability Issued in PCT Application No. PCT/US2014/057321", Mailed Date: Dec. 4, 2015, 7 Pages.

"International Preliminary Report on Patentability Issued in PCT Application No. PCT/US2014/057939", Mailed Date: Dec. 4, 2015, 5 Pages.

Office Action dated Jan. 29, 2016 cited in U.S. Appl. No. 14/231,869.

Office Action dated Feb. 1, 2016 cited in U.S. Appl. No. 14/231,880.

"International Preliminary Report on Patentability Issued in PCT Application No. PCT/US2014/057938", Mailed Date: Dec. 23, 2015, 8 Pages.

"International Preliminary Report on Patentability Issued in PCT Application No. PCT/US2014/057323", Mailed Date: Dec. 23, 2015, 7 Pages.

"International Preliminary Report on Patentability Issued in PCT Application No. PCT/US2014/057940", Mailed Date: Dec. 23, 2015, 9 Pages.

Office Action dated Feb. 16, 2016 cited in U.S. Appl. No. 14/231,883.

Office Action dated Feb. 26, 2016 cited in U.S. Appl. No. 14/231,891.

"International Preliminary Report on Patentability Issued in PCT Application No. PCT/US2014/057938", Mailed Date: Sep. 17, 2015, 7 Pages.

International Search Report and Written Opinion Issued in PCT Application No. PCT/US2014/057324, Mailed Date: Jun. 24, 2015, 5 Pages.

Second Written Opinion Issued in PCT Application No. PCT/US2014/057939, Mailed Date: Jun. 24, 2015, 4 Pages.

"International Preliminary Report on Patentability Issued in PCT Application No. PCT/US2014/057324", Mailed Date: Aug. 5, 2015, 6 pages.

Second Written Opinion Issued in PCT Patent Application No. PCT/US2014/057321, Mailed Date: Aug. 7, 2015, 6 Pages.

(56) References Cited

OTHER PUBLICATIONS

"W3C Technical Reports", Published Nov. 11, 1999, 8 Pages. Available at <<http://www.w3.org/Consortium/Process/Process-19991111.tr.html#RecsCR>>.
Second Written Opinion Issued in PCT Application No. PCT/US2014/057940, Mailed Date: Aug. 27, 2015, 8 Pages.
Notice of Allowance dated Jun. 20, 2016 cited in U.S. Appl. No. 14/231,891.
Office Action dated Aug. 17, 2016 cited in U.S. Appl. No. 14/231,869.
Notice of Allowance dated Aug. 29, 2016 cited in U.S. Appl. No. 14/231,883.
U.S. Appl. No. 14/231,883, May 24, 2016, Office Action.
U.S. Appl. No. 14/231,862, May 19, 2016, Office Action.
U.S. Appl. No. 14/231,846, Jun. 14, 2016, Office Action.
U.S. Appl. No. 14/231,897, Jun. 2, 2016, Office Action.
Office Action dated Sep. 6, 2016 cited in U.S. Appl. No. 14/231,880.
Office Action dated Sep. 9, 2016 cited in U.S. Appl. No. 14/231,873.
Office Action dated Sep. 16, 2016 cited in U.S. Appl. No. 14/231,897.
Office Action dated Sep. 23, 2016 cited in U.S. Appl. No. 14/231,846.
Office Action dated Nov. 17, 2016 cited in U.S. Appl. No. 14/231,912.
Office Action dated Jan. 11, 2017 cited in U.S. Appl. No. 14/231,917.
Notice of Allowance dated Feb. 13, 2017 cited in U.S. Appl. No. 14/231,869.
Office Action dated Feb. 21, 2017 cited in U.S. Appl. No. 14/231,862.
Office Action dated Feb. 24, 2017 cited in U.S. Appl. No. 14/231,897.
Office Action dated Apr. 3, 2017 cited in U.S. Appl. No. 14/231,880.
European Office Action issued in EPO Patent Application No. 14783733.0 mailed May 22, 2017.
U.S. Appl. No. 14/231,873, filed May 17, 2017, Office Action.
U.S. Appl. No. 14/231,862, filed Jun. 14, 2017, Notice of Allowance.
U.S. Appl. No. 14/231,897, filed Jun. 16, 2017, Notice of Allowance.

* cited by examiner

# GENERATING EXCUTABLE CODE FROM COMPLAINT AND NON-COMPLIANT CONTROLS

CROSS-REFERENCE TO RELATED APPLICATIONS

This application claims the benefit of each of the following provisional patent applications, and each of the following provisional patent applications are incorporated herein by reference in their entirety:
1. U.S. Provisional Application Ser. No. 61/905,101, filed Nov. 15, 2013;
2. U.S. Provisional Application Ser. No. 61/884,743, filed Sep. 30, 2013;
3. U.S. Provisional Application Ser. No. 61/905,111, filed Nov. 15, 2013;
4. U.S. Provisional Application Ser. No. 61/905,243, filed Nov. 17, 2013;
5. U.S. Provisional Application Ser. No. 61/905,114, filed Nov. 15, 2013;
6. U.S. Provisional Application Ser. No. 61/905,116, filed Nov. 15, 2013;
7. U.S. Provisional Application Ser. No. 61/905,129, filed Nov. 15, 2013;
8. U.S. Provisional Application Ser. No. 61/905,105, filed Nov. 15, 2013;
9. U.S. Provisional Application Ser. No. 61/905,247, filed Nov. 17, 2013;
10. U.S. Provisional Application Ser. No. 61/905,128, filed Nov. 15, 2013; and
11. U.S. Provisional Application Ser. No. 61/905,119, filed Nov. 15, 2013.

BACKGROUND

A current paradigm for navigating through various information contexts is windows based. A classic example of this is the web browser experience. A user might begin with a home page that occupies the entire browser space. The user might then select a hyperlink, whereupon a new window appears. However, the previous window either disappears or, in the case of exercising an option to open the new page in a new window, the previous window is fully, or at least partially, hidden.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

At least some embodiments described herein relate to a hierarchy of controls and parts, that are each in accordance with constraints of a computing executing context. A control is executable code that performs a function and which may impart a visualization. A part is a unit of visualization container that has its own visualization and/or shows visualizations from one or more compliant parts associated with the part.

Controls that comply with the constraints of the computing execution context that are relevant to controls ("control constraints") will be referred to herein as "compliant controls". Parts that comply with the constraints of the computing execution context that are relevant to parts ("part constraints") will be referred to herein as "compliant parts".

The computing executing context may be, for instance, a user interface or portal that allows a user to navigate through computer state using visualizations. The constraints may be designed to give a consistent function and visualization throughout the computing execution context. For instance, each part may have a set of functions that are consistent with other parts, and yet provide some further distinct functionality that does not adversely affect the look and feel of the computing executing context. Each part may also have visualizations that allow them to visually fit well with other parts within the computing execution contexts. The control constraints may similarly be designed to preserve the consistency of the user interface.

Application authors may use a library of compliant controls to construct their own unique parts to be executed within the computing execution context. However, such parts may be subject to checking to ensure the part is a compliant part prior to the part becoming executable within the computing execution context. Such extrinsic parts (i.e., parts not offered by the computing execution context itself) may be shared with other application authors, or submitted to the computing execution context for possible inclusion in a library of compliant parts. The library of compliant parts may be made available to multiple application authors as a basic unit of visualization. The compliant controls may be automatically generated from non-compliant controls by appropriate configuration of the non-compliant controls.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
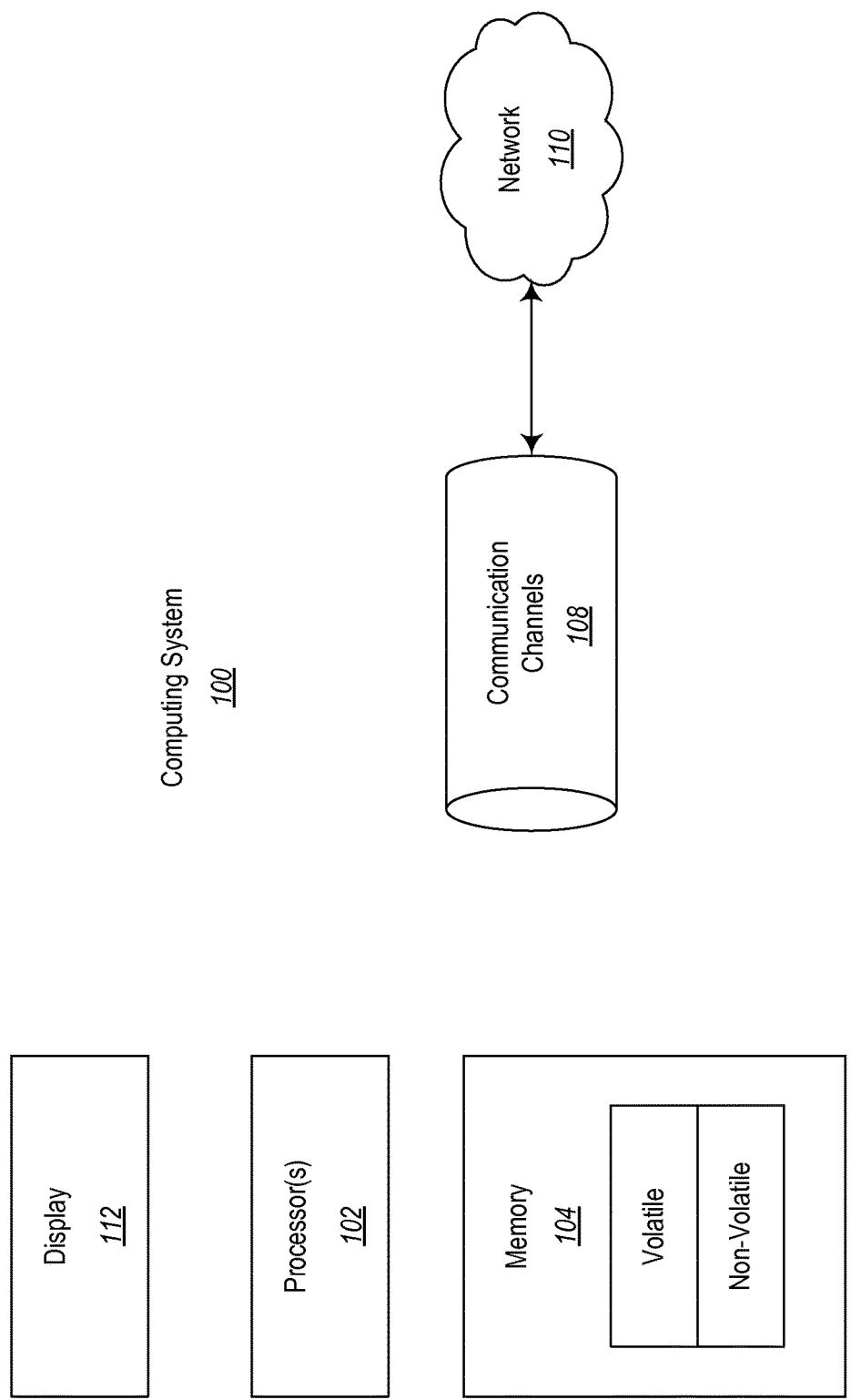
FIG. 1 abstractly illustrates an example computing system in which the principles described herein may be employed.

At least some embodiments described herein relate to a hierarchy of controls and parts, that are each in accordance with constraints of a computing executing context. A control is executable code that performs a function and which may impart a visualization. A part is a unit of visualization container that has its own visualization and/or shows visualizations from one or more compliant parts associated with the part.

Controls that comply with the constraints of the computing execution context that are relevant to controls ("control constraints") will be referred to herein as "compliant controls". Parts that comply with the constraints of the computing execution context that are relevant to parts ("part constraints") will be referred to herein as "compliant parts".

The computing executing context may be, for instance, a user interface or portal that allows a user to navigate through computer state using visualizations. The constraints may be designed to give a consistent function and visualization throughout the computing execution context. For instance, each part may have a set of functions that are consistent with other parts, and yet provide some further distinct functionality that does not adversely affect the look and feel of the computing executing context. Each part may also have visualizations that allow them to visually fit well with other parts within the computing execution contexts. The control constraints may similarly be designed to preserve the consistency of the user interface.

Application authors may use a library of compliant controls to construct their own unique parts to be executed within the computing execution context. However, such parts may be subject to checking to ensure the part is a compliant part prior to the part becoming executable within the computing execution context. Such extrinsic parts (i.e., parts not offered by the computing execution context itself) may be shared with other application authors, or submitted to the computing execution context for possible inclusion in a library of compliant parts. The library of compliant parts may be made available to multiple application authors as a basic unit of visualization. The compliant controls may be automatically generated from non-compliant controls by appropriate configuration of the non-compliant controls.

Some introductory discussion of a computing system will be described with respect to FIG. 1. Then, example user interfaces, methods and supporting architectures will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

The computing system 100 also includes a display 112 on which a user interface, such as the user interfaces described herein, may be rendered. Such user interfaces may be generated in computer hardware or other computer-represented form prior to rendering. The presentation and/or rendering of such user interfaces may be performed by the computing system 100 by having the processing unit(s) 102 execute one or more computer-executable instructions that are embodied on one or more computer-readable media. Such computer-readable media may form all or a part of a computer program product.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
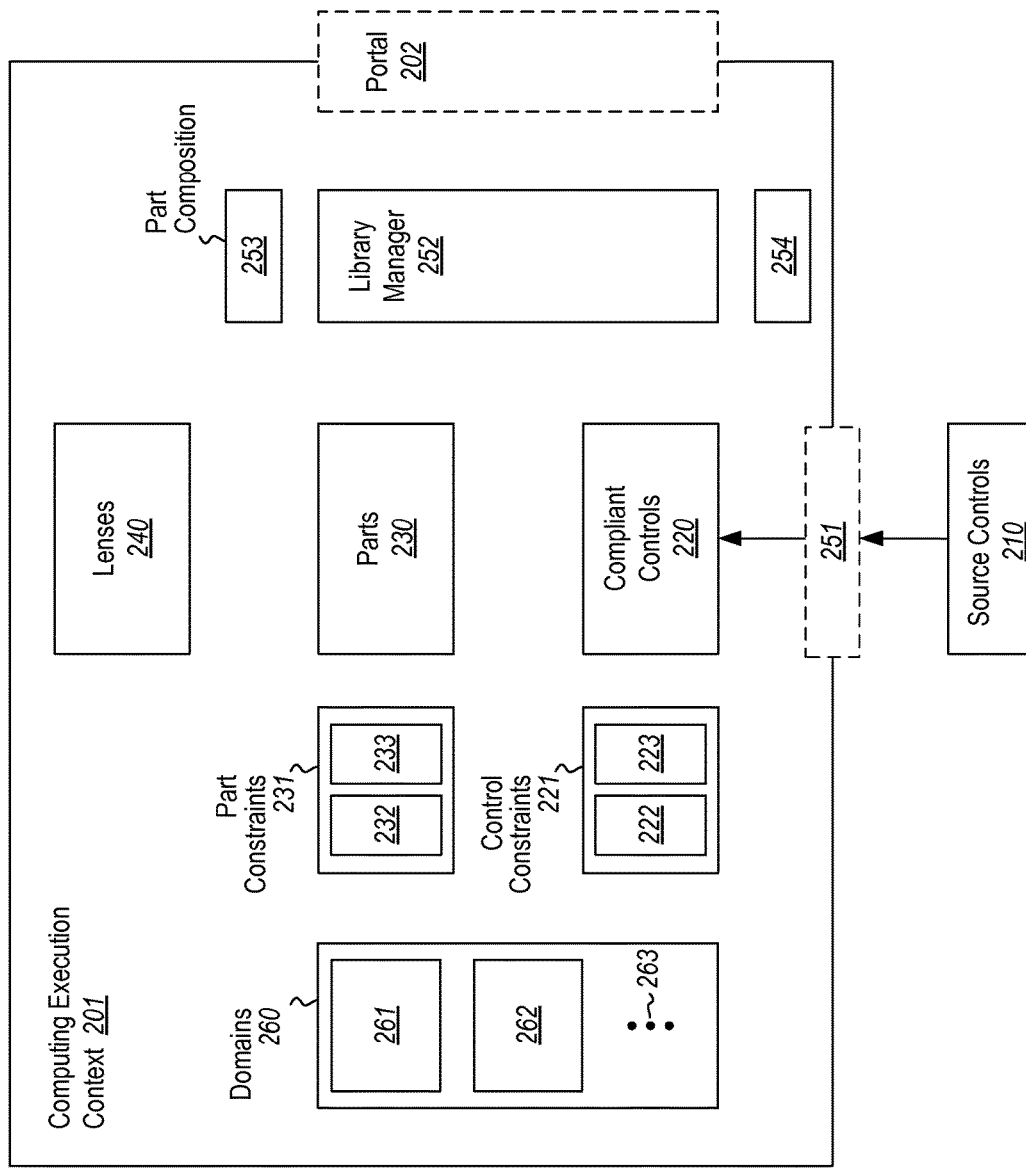
FIG. 2 illustrates an example hierarchical architecture in which the principles described herein may operate, and which includes non-compliant controls, compliant controls, parts and lenses.

FIG. 2 illustrates an example hierarchical architecture 200 in which the principles described herein may operate. There are four levels of the hierarchy 200 illustrated including, from bottom up, source controls 210, compliant controls 220, parts 230, and lenses 240. All of the levels of the hierarchy 200, except for the source controls 210, operating within a computing execution context 201.

The computing execution context 201 includes a portal 202 that represents viewable results of operations occurring within the computing execution context 201. For instance, the portal 202 might be a web portal, or a portal present on a client machine. In the latter case, the computing execution context 201 may either also be present on the client machine, may be remotely located from the client machine (such as in the cloud), or some combination thereof. The display 112 may be used for purposes of visualizing the portal 202.

The computing execution context 201 imposes control constraints 221 on the compliant controls 220, and part constraints 231 on the parts 230. The constraints 221 and 231 are designed to preserve a level of consistency in the appearance and behavior of the computing execution context 201 as manifest within the portal 202 and as desired for the internal operations within the computing execution context 201. For instance, the control constraints 221 may include functional constraints 222 that restrict operation of the controls, and visualization constraints 223 that constrain how the results of the execution of the control is visualized within the portal 202. The part constraints 231 may include functional constraints 232 that restrict operation of the controls, and visualization constraints 233 that constrain how the results of the execution of the control is visualized within the portal 202.

The source controls 210 do not necessarily satisfy the control constraints 221 of the computing execution context 201. The computing execution context 201 will thus not allow the source controls 210 to be executed by the computing execution context 201. However, one or more of the compliant controls 220 may be derived at least in part from one or more of the source controls 210. For instance, the computing execution context 201 illustrates a control constrainer 251 that derives compliant controls that satisfy the control constraints 221 from source controls 210 that do not satisfy the control constraints 221.

An advantage of the system 200 is that there may be multiple classes of contributors to the hierarchy of elements involved in the computing execution context 201, even in spite of the presence of constraints 221 and 231. Thus, many individuals may contribute to a comprehensive experience while still preserving a consistent user experience.

Figure 3:
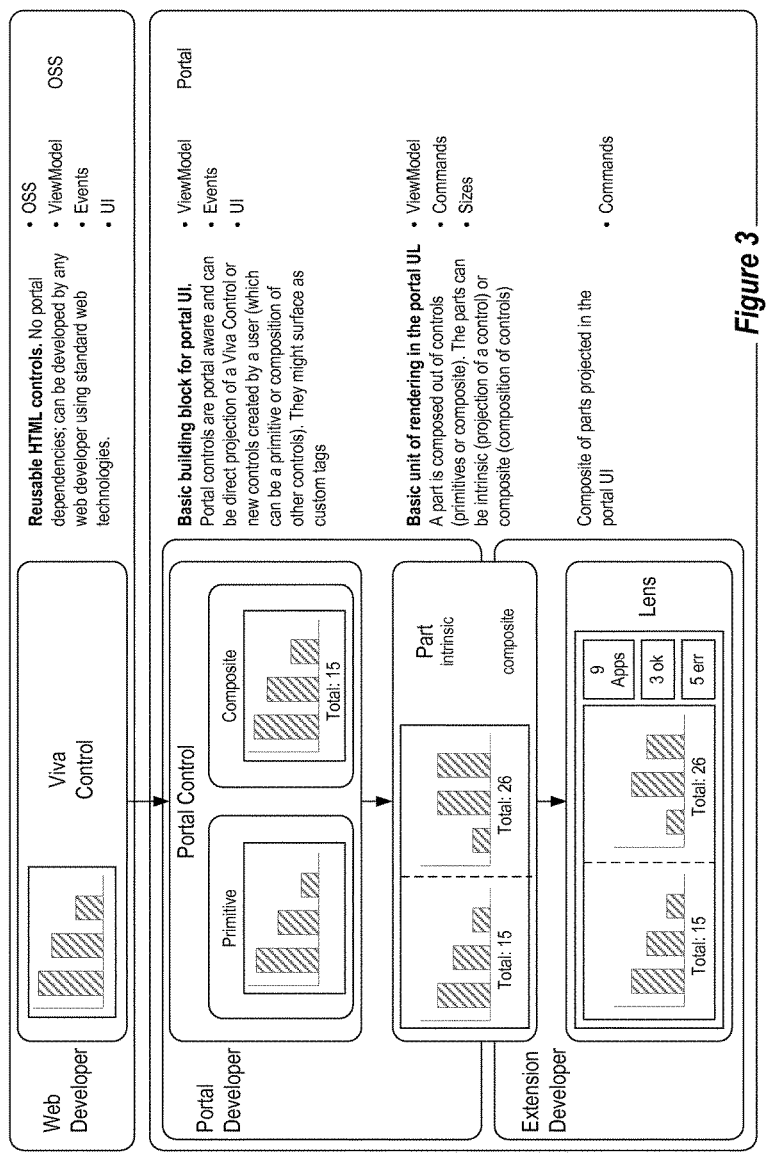
FIG. 3 illustrates a more specific example hierarchical architecture, and represents an example of the hierarchical architecture of FIG. 2, albeit with the flow going top down, rather than bottom up.

For instance, since the source controls 210 have no constraints, the source controls may be authored by any developer using any technologies available to that developer without restriction. As an example, the source controls might be regular widgets that use combinations of HyperText Markup Language (HTML), JavaScript (JS) and Cascading Style Sheets (CSS). FIG. 3 illustrates a more specific example hierarchical architecture, and represents an example of the hierarchical architecture of FIG. 2, albeit with the flow going top down, rather than bottom up. In FIG. 3, the source controls 210 are labeled as "Viva" controls.

The compliant controls 220, on the other hand, comply with the predetermined set of control constraints 221. The computing execution context 201 thus allows the compliant controls 220 to execute to thereby affect a state of the computing execution context 201 and the visualizations manifest via the portal 202. In one embodiment, the complaint controls 220 are structured so as to not be executable outside of the computing execution context 201. As previously mentioned, a compliant control 220 may be derived at least in part from a source control 210. Alternatively, a compliant control 220 may be authored already to be compliant. As a further alternative, the complaint control may be derived at least in part from one or more other controls, compliant or otherwise. Thus, any given compliant control may represent a single standing control, or perhaps a complex hierarchy of controls. In FIG. 3, the "portal controls" are illustrated as examples of the compliant controls 220, and illustrate an example primitive control (derived from the single illustrated Viva control) and an example composite control (derived from the single illustrated Viva control as well as another control that provides a total number).

In one embodiment, the set of available compliant controls 220 are controlled by the developer of the computing execution environment 201. For instance, a library manager 252 is provided within the computing execution context 201, and allows for the compliant controls 220 to be identified to application developers, through the portal 202.

The parts 230 are each basic building blocks for the portal 202. The part may be authored using a custom template without involving any controls whatsoever. However, in many, if not most cases, a part is a visualization container that projects visualized results from one or more compliant controls 220 onto the portal 202.

The developer of the computing execution context (and/or the entity that sets the part constraints 231 and thus sanitizes the parts) may provide intrinsic parts which provided rich and consistent functionality (e.g. display in multiple sizes, deal with errors, show progress, and so forth) that is consistent with the part constraints 231, and which may be used to operate across a wide variety of domains. In this sense, the computing execution context 201 may be thought of a "shell" or "container" in which application developers may run their more specific experiences.

Application developers may also use those intrinsic parts, or they may also create their own extrinsic parts or "custom" parts to perhaps operate in a more specific domain of their application (also called an "extension" herein). In order to ensure that such custom parts comply with the computing execution environment 201, the extrinsic part is created and or verified using a part composition component 253 within the computing execution context 201. In FIG. 3, the parts are illustrated as being provided by both the portal developer (i.e., the provider of the computing execution context 201) for intrinsic parts, and by the extension developer (e.g., an application developer) for extrinsic parts. The part composition component 253 may provide sanitization such as, for example, filter what scripts and styles can be in part templates and what classes can be in css style files.

The intrinsic parts are made available to extension developers also via the library manager 252 and the portal 202. Furthermore, extension developers may share an extrinsic part they have created with other extension developers using a sharing module 254 of the computing execution environment. The library manager 252 may also present such shared extrinsic parts to application developers. The creator of the extrinsic part may also apply via the library manager to have their part included as an intrinsic part, if the part has more general application.

The visualization of a part is data-driven. In other words, a change in the data that drives a part may affect the visualization of the part and/or the visualization of information associated with that part. Furthermore, a part's ability to display information may be determined based on the domain in which the data resides. For instance, the data may be within a particular database or within a particular web site. The manner in which the part is visualized may differ depending on the domain, even if the data is the same. Thus, if a part is moved between domains (e.g., from a website to a database), the visualization of the part may change due to a change of data, but even if the data was the same, the visualization may still differ due to the change in domain. In FIG. 2, for example, domains 260 are illustrated as including potential domains in which the parts 230 may be placed. The illustrated domains include domains 261 and 262, though the ellipses 263 represents that there may be other possible numbers of domains 260 that the parts 230 may be placed in. The computing execution context 201 remains aware of the domains 260 and the manner in which each part is displayed in each domain 260.

The application developer may combine the parts into lenses 240. In this description and in the claims, a "lens" is a logical grouping of parts that can be treated as a unit (e.g., are moved around together).

This model enables different levels of sharing and protection. Controls that may be operated outside of the computing execution context 201, and/or which are approved for sharing the source code, may be added to the source controls 210. On the other hand, for controls that are not to have the code shared, but which are still desirable to use in the computing execution context, a control 220 may be directly created. For very simply functionality, or even for more complex functionality, a part may be created with a custom template, without the backing of any controls at all.

Figure 4:
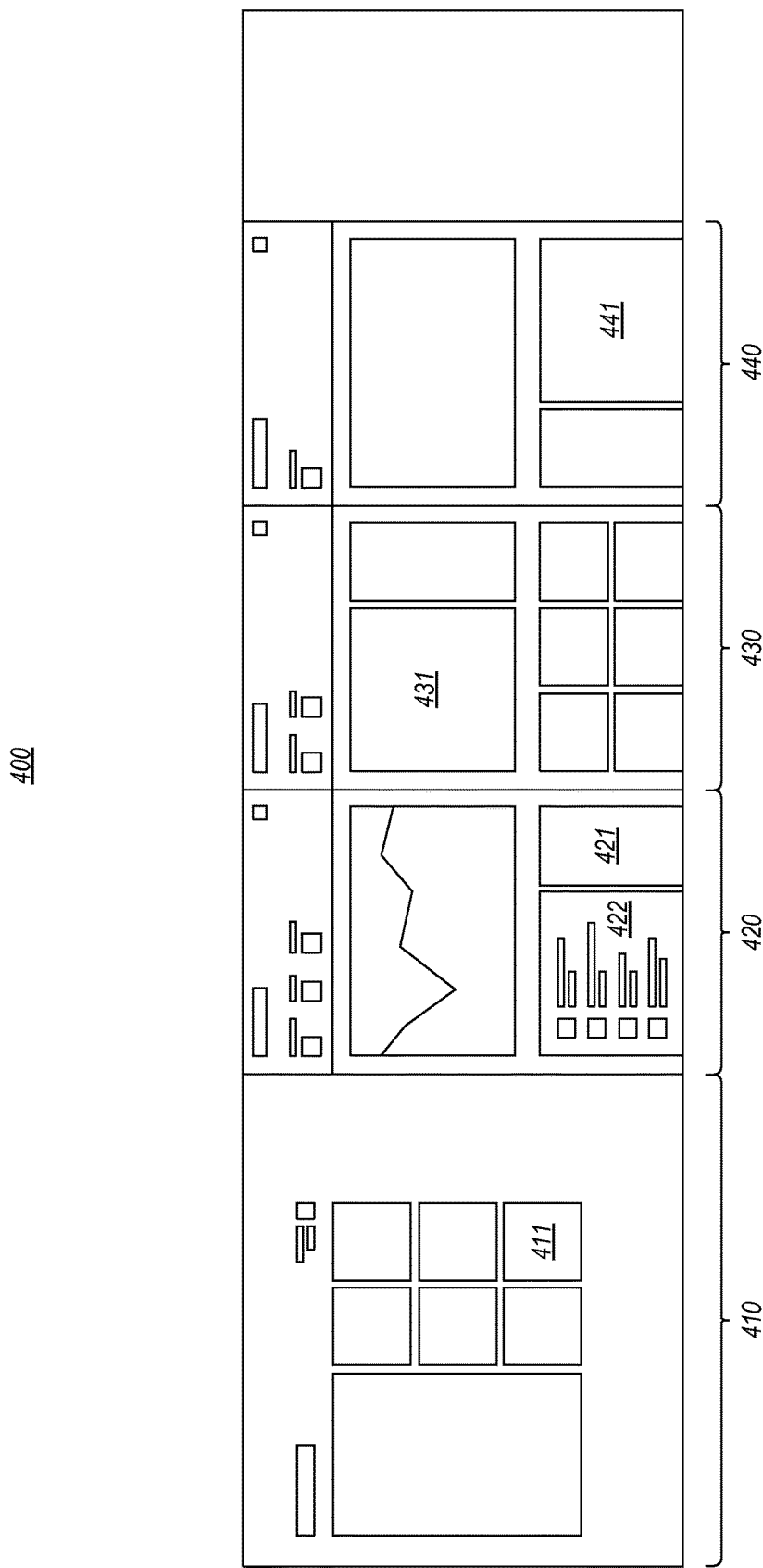
FIG. 4 illustrates a much more detailed user interface that includes a canvas populated by a large number of selectable elements.

In one embodiment, lenses may be further combined by application developers into blades. To illustrate the relationship between parts, lenses, and blades, FIG. 4 illustrates a much more detailed user interface 400 that includes a canvas populated by a large number of selectable elements. Only a few of the selectable elements are labeled as they are more relevant for the discussion herein.

In the context of FIG. 4, the user interface is a canvas that is horizontally extendable rightward as the user engages with the canvas. The canvas may be scrollable rightward and leftward. The canvas might have originally included only a favorites area 410 that includes multiple selectable parts, including part 411. When the user selects part 411, a blade 420 appears. A blade is a user interface component that occupies a position range along the extendable direction of the canvas, and occupies substantially all of the orthogonal range of the canvas at that location.

The blade 420 includes multiple selectable elements (e.g., parts), some of which perhaps being grouped into lenses. For instance, the blade 420 includes part 421 and 422, amongst other parts. The parts 421 and 422 are combined into a lens such that they are moved as a unit together. When the part 421 is selected, a further blade 430 appears, which further includes selectable elements such as the part 431. When the part 431 is selected, a further blade 440 appears, which further includes selectable elements such as part 441. This may continue to allow the user to engage in a custom journey building up a canvas of history showing the path taken to get to where the user is presently.

Authoring tools, such as an authoring language, may be created in order to assist application developers in creating parts, lenses, and blades for their extension. As an example, a "Portal Definition Language" (PDL) may be provided based on eXtensible Markup Language (XML). Both intrinsic parts and extrinsic parts can be used within the authoring language. However, for extrinsic parts, the developer would provide a template and executable code (also referred to as a "viewmodel") describing the behavior of the extrinsic part.

Figure 5:
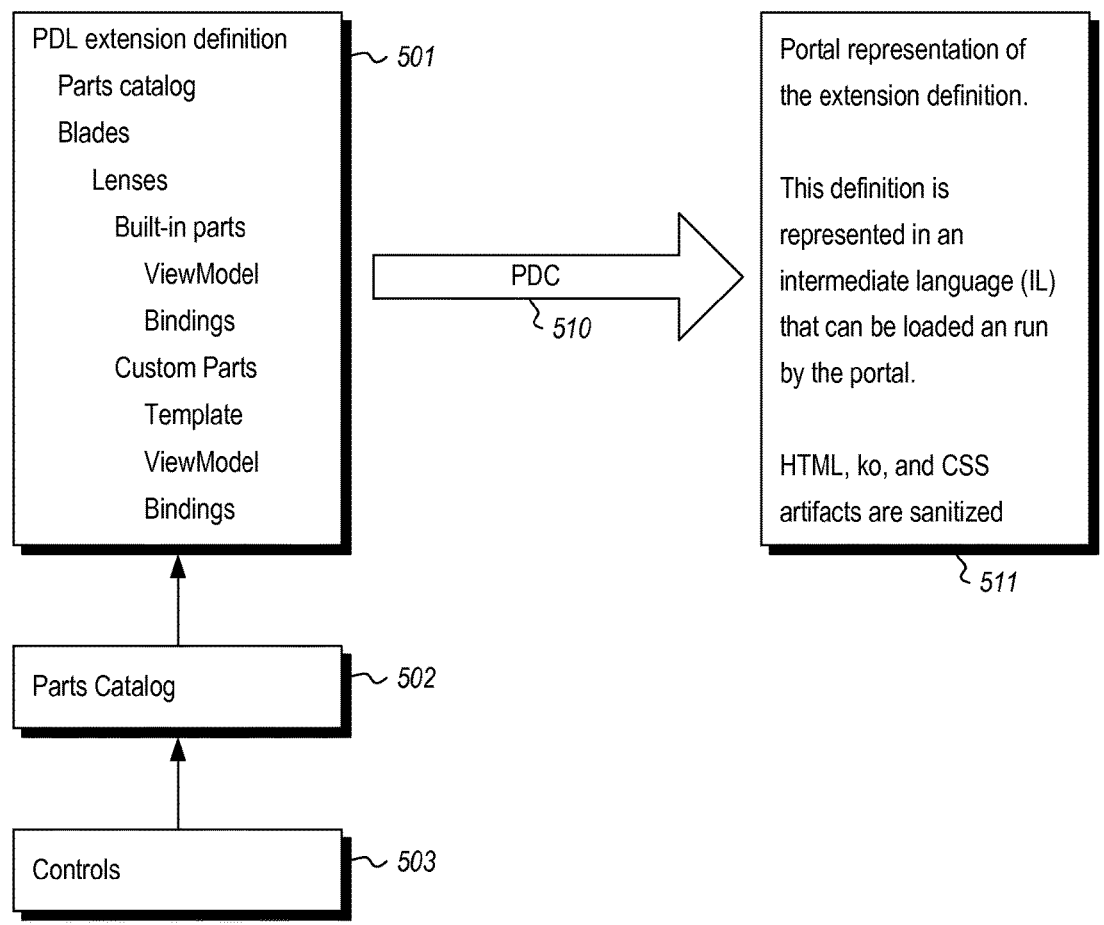
FIG. 5 illustrate a general authoring environment that includes a PDL extension definition, which is an example of an application definition.

FIG. 5 illustrate a general authoring environment 500 that includes a PDL extension definition 501 (an example of an application definition). The definition 501 includes a parts catalog identifying the parts catalog 502 being used by the definition, which parts also rely on controls 503 (e.g., compliant controls 220). The definition 501 also includes a list of blades. Each blade definition includes a list of lenses. Each lens definition includes a definition of one or more parts included within the lens. For intrinsic parts, the developer merely identifies the viewmodel and the bindings to data. For extrinsic parts, the developer provides the viewmodel and additionally identifies the bindings and template for the part. Thus, the application definition includes a definition of a function set and a visualization setting set for each part. One possible restriction is that the controls and parts are implemented using the "MVVM (Model View ViewModel) pattern, which requires a viewModel. Parts observably react to changes in that viewmodel.

The application definition is then compiled. For instance, in FIG. 5, the PDL extension definition 501 is compiled using a Portal Definition Compiler (PDC) as represented by arrow 510. The result is executable code that for each part performs at least those portions of the function set that are consistent with the functional part constraints 232 corresponding to the computing execution context 201, and at least those portions of the visualization set that are consistent with the visualization part constraints. For instance, the result might be an intermediate DSL language based on JavaScript/typescript as represented by the portal representation 511 in FIG. 5.

The compilation process is performed upon determining that the defined function set and the defined visualization set of each of the custom parts are consistent with a predetermined set of part constraints corresponding to the computing execution context. If that were not the case, compilation would fail. In that case, the compilation process provides feedback about what went wrong, helping developers to quickly solve their problems.

Accordingly, embodiments described herein provide a composable hierarchy of controls and parts that may be authored by third parties, and yet comply with the look, feel and behavior of the surrounding user interface context.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable memory having thereon computer-executable instructions that are structured such that, when executed by one or more processors of a computing system, cause the computing system to perform a method for facilitating composition of a part that represents a visualized container executed within a computing execution context, the method comprising:
   a user defining a part that includes a definition of one or more function set controls and one or more visualization setting set controls;
   automatically determining that a first portion of the defined controls are compliant with a predetermined set of part constraints corresponding to the computing execution context, wherein a compliant control is one that is executable within the execution context, but that a second portion of the defined controls are non-compliant with the predetermined set of part constraints corresponding to the computing execution context, wherein a non-compliant control is one that is not executable within the execution context:
   automatically generating at least one compliant control, for execution within the part, from the second portion of defined controls by configuration of the at least one non-compliant control; and
   generating executable code that represents the part from at least the first portion that performs at least those portions of the function set controls that are compliant with the functional part constraints corresponding to the computing execution context, those portions of the visualization set controls that are compliant with the visualization part constraints, and from the at least one compliant control automatically generated from the second, non-compliant, portion of the defined controls.

2. The computer program product in accordance with claim 1, the act of defining a part comprising:
   an act of referencing at least one control included in a set of controls, each of which a) satisfying a predetermined set of control constraints of the computing execution context, and b) being available for execution within the computing execution context.

3. The computer program product in accordance with claim 1, the act of generating performed so that the part executable code also performs a set of standard part functions not defined by the user and which are compliant with the part constraints of the computing execution context.

4. The computer program product in accordance with claim 1, the act of generating performed so that the part executable code also visualizes in accordance with a set of standard visualizations not defined by the user.

5. The computer program product in accordance with claim 1, further comprising:
   an act of providing the part as part of an extension to a set of intrinsic part, the intrinsic parts being used for multiple domains within the computing execution context, and the extension being used for a subset of the multiple domains within the computing execution context.

6. The computer program product in accordance with claim 1, further comprising:
   an act of submitting the part to a library manager of a set of intrinsic parts that each comply with the predetermined set of part constraints corresponding to the computing execution context.

7. The computer program product in accordance with claim 6, further comprising:
   an act of accessing one or more intrinsic parts from the set of intrinsic parts, the set of intrinsic parts being available to multiple application developers.

8. The computer program product in accordance with claim 1, the part constraints comprising functional part constraints of the computing executing context.

9. The computer program product in accordance with claim 1, the part constraints comprising visualization part constraints of the computing executing context.

10. The computer program product in accordance with claim 1, wherein the automatic determination that the second portion of the defined controls are non-compliant with the predetermined set of part constraints corresponding to the computing execution context includes a part composition component configured to provide sanitation of the defined part.

11. A method for facilitating composition of a part that represents a visualized container executed within a computing execution context, the method comprising:
   accessing a part that includes a definition of one or more function set controls and one or more visualization setting set controls;
   automatically determining that a first portion of the defined controls are compliant with a predetermined set of part constraints corresponding to the computing execution context, wherein a compliant control is one that is executable within the execution context, but that a second portion of the defined controls are non-compliant with the predetermined set of part constraints corresponding to the computing execution context, wherein a non-compliant control is one that is not executable within the execution context;
   automatically generating at least one compliant control, for execution within the part, from the second portion of defined controls by configuration of the at least one non-compliant control; and in response to the act of automatically generating, generating executable code that represents the part from at least:

the first portion that represents the part and which performs at least those portions of the function set controls that are compliant with the functional part constraints corresponding to the computing execution context;

the first portion that represents the part and which performs at least those portions of the visualization set controls that are compliant with the visualization part constraints; and the at least one compliant control automatically generated from the second, non-compliant, portion of the defined controls.

12. The computer program product in accordance with claim 10, wherein the sanitation of the defined part includes filtering what scripts and styles can be in part templates and what classes can be in CSS style files.

* * * * *